July 14, 1925.
C. P. GRASSMUCK
CAMERA
Filed May 26, 1922
1,545,757
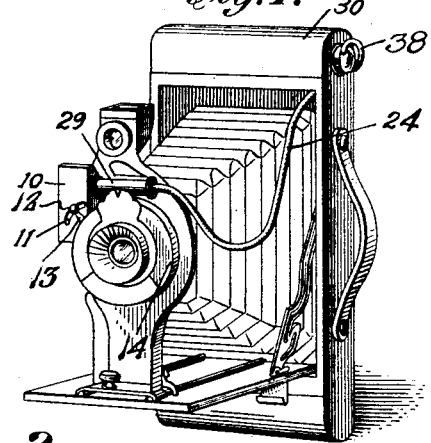
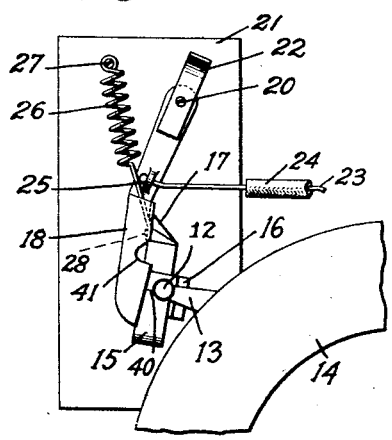
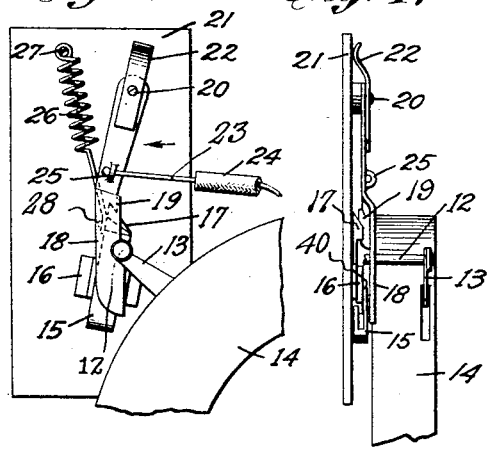
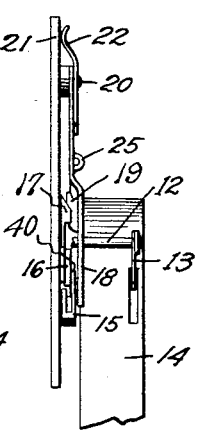
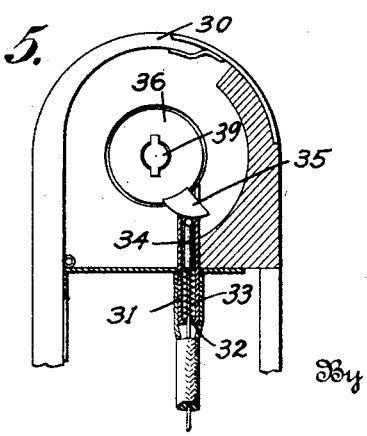
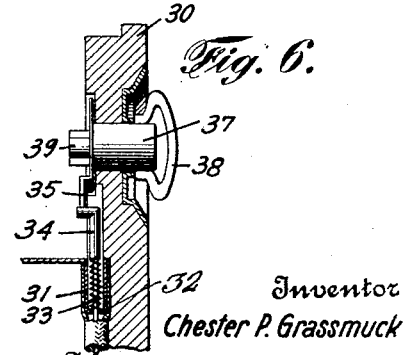
Inventor
Chester P. Grassmuck
By Attorney

Patented July 14, 1925.

1,545,757

UNITED STATES PATENT OFFICE.

CHESTER P. GRASSMUCK, OF NEWARK, NEW JERSEY.

CAMERA.

Application filed May 26, 1922. Serial No. 563,861.

*To all whom it may concern:*

Be it known that I, CHESTER P. GRASSMUCK, a citizen of the United States, and a resident of Newark, Essex County, New Jersey, have invented an Improvement in Cameras, of which the following is a specification.

My invention relates to cameras and more particularly to the shutter mechanism thereof.

The objection of my invention is to provide a simple and efficient device which is inexpensive to manufacture and durable in operation. My invention provides for a means to prevent the possibility of a double exposure or a non-exposure of a film in the taking of pictures, and I accomplish this by having a mechanism adjacent the shutter of a camera and mounted in such a way as to be interconnected with the customary finger piece or lever that operates to open and close the shutter. This lever has a pin which engages a locking member when the shutter has been tripped so as to prevent the operator from tripping it again until the film has been moved down to the desired position, whereupon the movement of the film disengages the locking member so that the operator can trip the shutter to expose the next succeeding picture area on the film. In other words, the shutter is normally locked and cannot be tripped until the film has been moved, whereupon it is unlocked to permit only one exposure and is then automatically locked again until the exposed film has been moved away and the unexposed film has replaced the exposed film.

Reference will be had to the accompanying drawings in which similar reference characters indicate corresponding parts throughout the several views.

Figure 1 is a perspective view of the camera;

Figure 2 is a detail of the shutter operating mechanism in open position;

Figure 3 is a similar view in the closed position;

Figure 4 is a side elevation of Figure 3;

Figure 5 is a detail of the spool housing; and

Figure 6 is a cross section of Figure 5.

Referring to the drawings, I have shown, by way of example merely, my mechanism attached to the shutter of a conventional camera, and the mechanism consists of a housing 10, having a slot 11 therein, so that the pin 12 of the finger piece 13 protruding from the shutter casing 14 may engage a sliding member 15 which is guided in a guide member 16, and has a cam portion 17 thereon which causes the arm 18 to ride thereon by reason of a depending portion 19. The arm 18 is pivoted at 20 and held down flat against a plate 21 by reason of a spring 22. The arm 18 is pivotally moved by reason of the flexible shaft 23, which is encased in a flexible cover 24, and engages the arm 18 at a point 25. The cam member 15 is held in normal position by reason of the spring 26 which is fixed to the plate 21 at a point 27 and riveted or otherwise secured at the point 28 to the sliding member 15. The flexible shaft 23 is held rigid above the shutter mechanism of the camera by reason of a cylindrical housing 29. It then runs back to the spool housing 30, and is fixed to a depending portion 31 of the spool housing 30. It will be seen that the tube 31 is flanged at 32 to hold a spring 33 which tends to urge an L-shaped member 34 into engagement with a cam 35 which is integral with a disk 36 on a stud shaft 37, which is normally rotated by a finger piece 38 to unwind a cartridge of film not shown.

In operating this device a usual cartridge of film not shown is placed in the film housing in the bottom of the camera and threaded up to the film housing 30 and fixed to the reduced portion 39 of the stud shaft 37, and then drawn up to bring the first picture area in focus with the lens of the camera. The picture is then ready to be exposed and the finger piece 13 of the shutter is unlocked and ready to be pushed down so as to trip the shutter and permit the film to be exposed. After the finger piece 13 has been pushed down and the shutter has been tripped, it will be seen by referring to Figure 2 that the pin 12 on the finger piece 13 engages the turned-up end 40 of the movable member 15, and forces it down against the tension of the spring 26 so that the cam 17 will pass the end of the depending portion 19 on the arm 18 and through the tension of the spring 33 the flexible shaft 23 will tend to pull the arm 18 in a direction toward the shutter housing and will then permit the spring 26 to raise the movable member 15 so that the cam 17 will slide on the depending portion 19, thereby forcing the arm 18 into a position shown in Figure 3 so that when the operator presses the finger piece 13 down into a position shown in Figure 3 it will be seen that the pin 12 engages in a hook portion 41 on the arm 18, thereby preventing the finger piece from being pushed down to its farthest position to operate the shutter. This securely locks the finger piece 13 so that the operator cannot make a double exposure of the film.

In order to unlock the shutter, or, in other words, to have the mechanism in the unlocked position, as shown in Figure 2, it is necessary to wind the film by turning the handle 38 of the stud shaft 37 in the proper direction. This turns the disk 36 and also the cam 35. The cam 35 will then come in contact with the L-shaped piece 34 to force it down against the tension of the spring 33 and in doing this it will move the flexible shaft 23, which is of course secured to the L-shaped piece 34, in a direction shown by the arrow in Figure 3. This causes the arm 18 to ride up on the cam 17 and disengage the pin 12 from the hook 41, and hold the arm in the position shown in Figure 2, so that the finger piece 13 is unlocked and the operator can then take a second picture. After this is exposed the mechanism works the same way to lock the shutter as hereinbefore described for the first-mentioned part of the film.

It will be understood that many modifications can be made of this invention without departing from the principle thereof, and the mechanism shown in the drawings is merely illustrative.

I claim:

1. A camera comprising a shutter controlling trigger and a winding key for the film roll, in combination with a trigger locking and unlocking mechanism, comprising a pin mounted on said trigger, a slidable U-shaped member having one of its arms inclined at the top to form a cam and the other engaging said pin, a pivoted arm having an offset engaging with said cam, and also having a notch engaging the aforesaid pin, a spring secured to the aforesaid U-shaped member to urge the aforesaid cam into engagement with the aforesaid pivoted arm, a flexible wire secured to said pivoted arm, and a cam integral with the aforesaid winding key to actuate the pivoted arm by acting upon the aforesaid flexible wire.

2. A camera, comprising a shutter controlling trigger and a winding key for the film roll, in combination with a trigger locking and unlocking mechanism, comprising a pin mounted on said trigger, a slidable U-shaped member having one of its arms inclined at the top to form a cam and the other engaging said pin, a pivoted arm having an offset engaging with said cam, and also having a notch engaging the aforesaid pin, a spring secured to the U-shaped member to urge the aforesaid cam into engagement with the offset on the pivoted arm to bring the notch on the pivoted arm in the path of the pin thereby locking the shutter trigger, a flexible wire secured to said pivoted arm, a cam integral with the aforesaid winding key to actuate the pivoted arm by acting upon the aforesaid flexible wire, and a spring adjacent the said winding key to keep the flexible wire in the path of the cam adjacent the winding key.

In testimony whereof, I have signed my name to this specification this 24th day of May 1922.

CHESTER P. GRASSMUCK.